Oct. 29, 1940.　　A. P. DE SEVERSKY　　2,219,980
AIRCRAFT
Filed June 15, 1938　　5 Sheets-Sheet 3
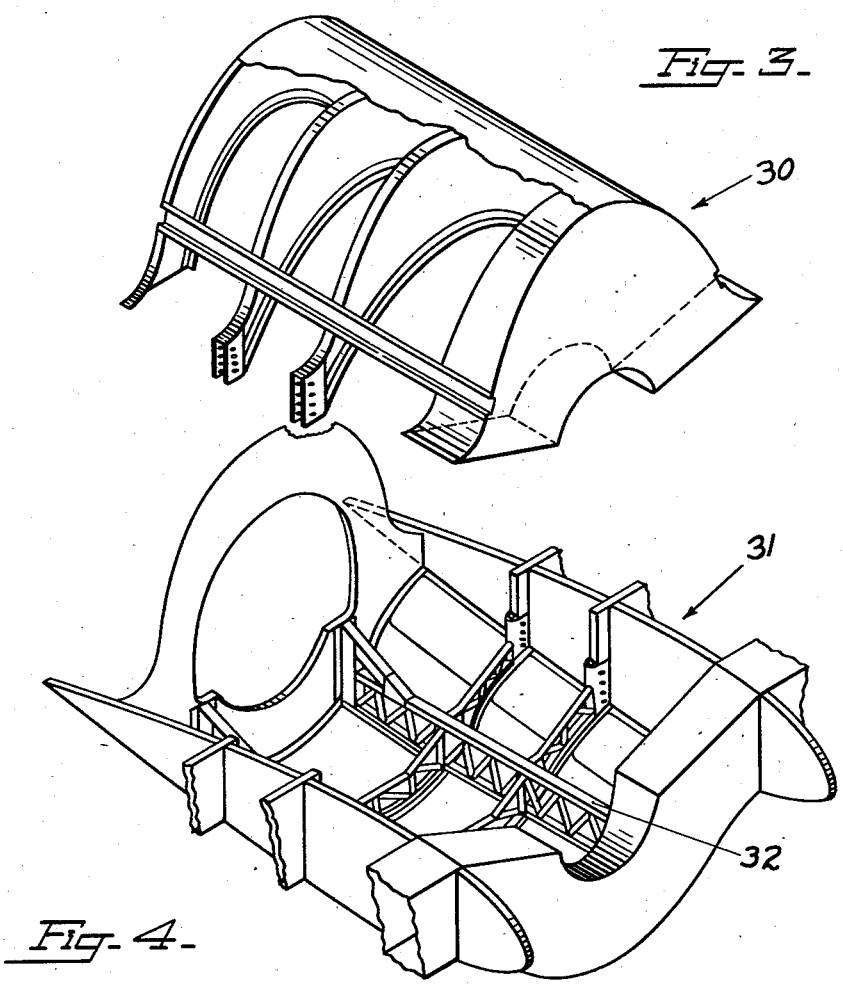
INVENTOR
Alexander P. de Seversky
BY
Robert C. Rasche
ATTORNEY

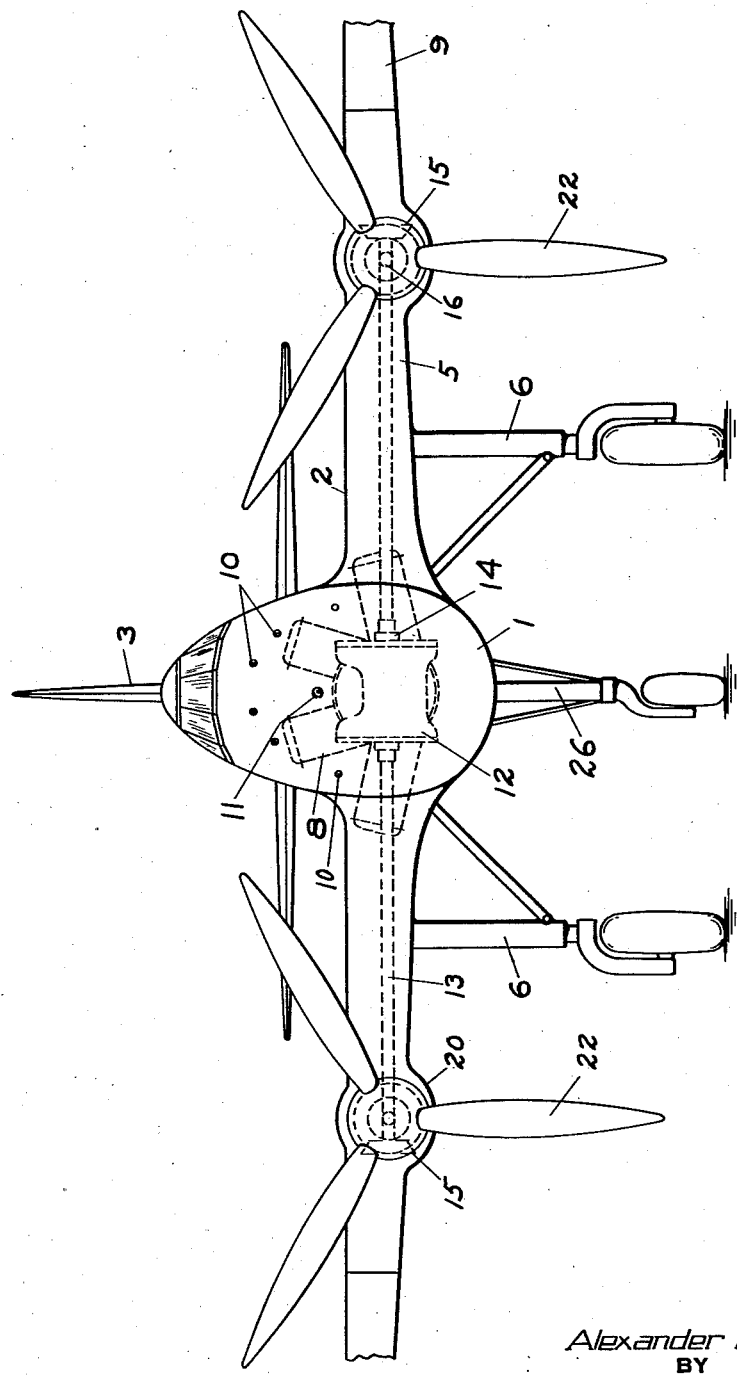

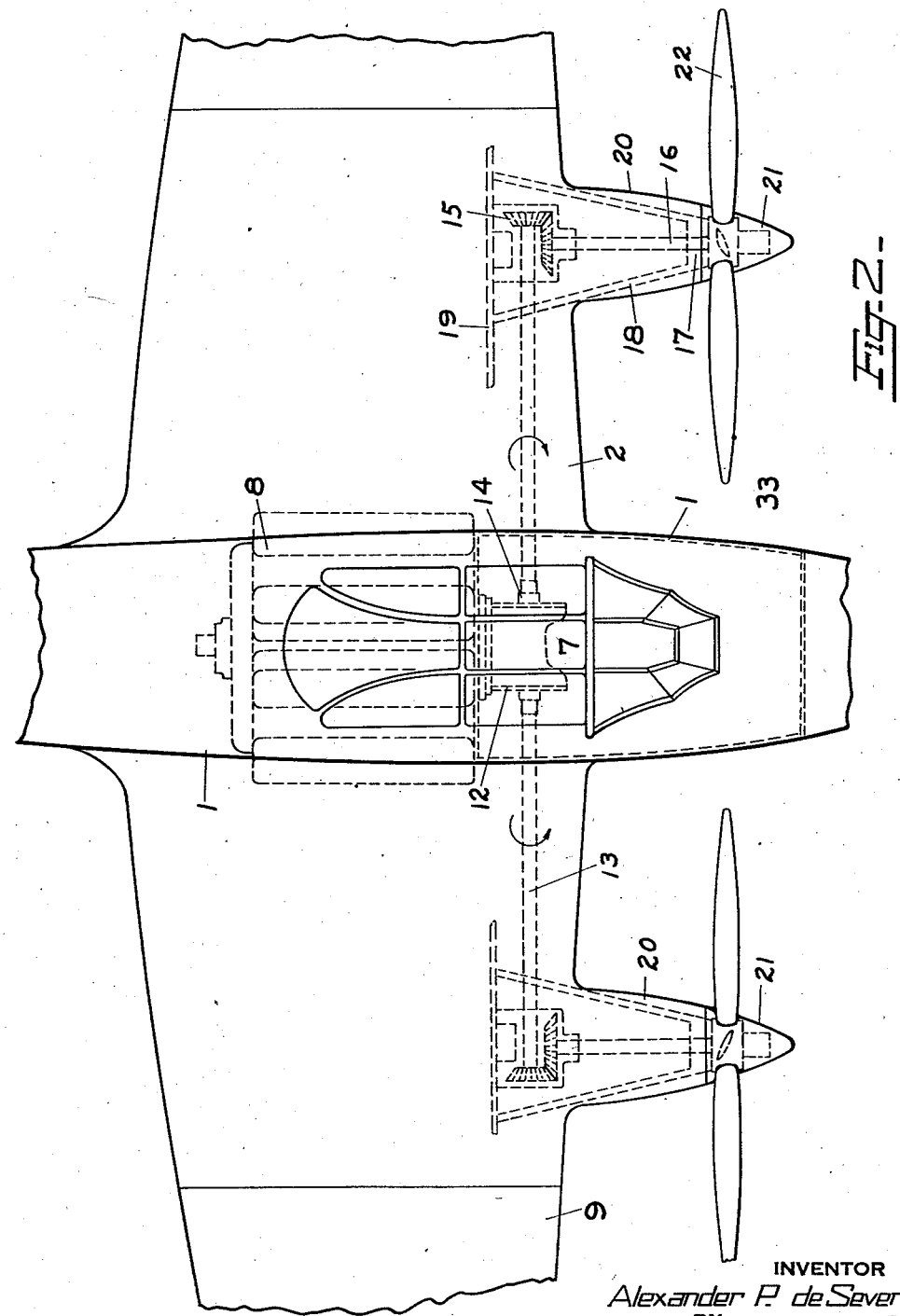

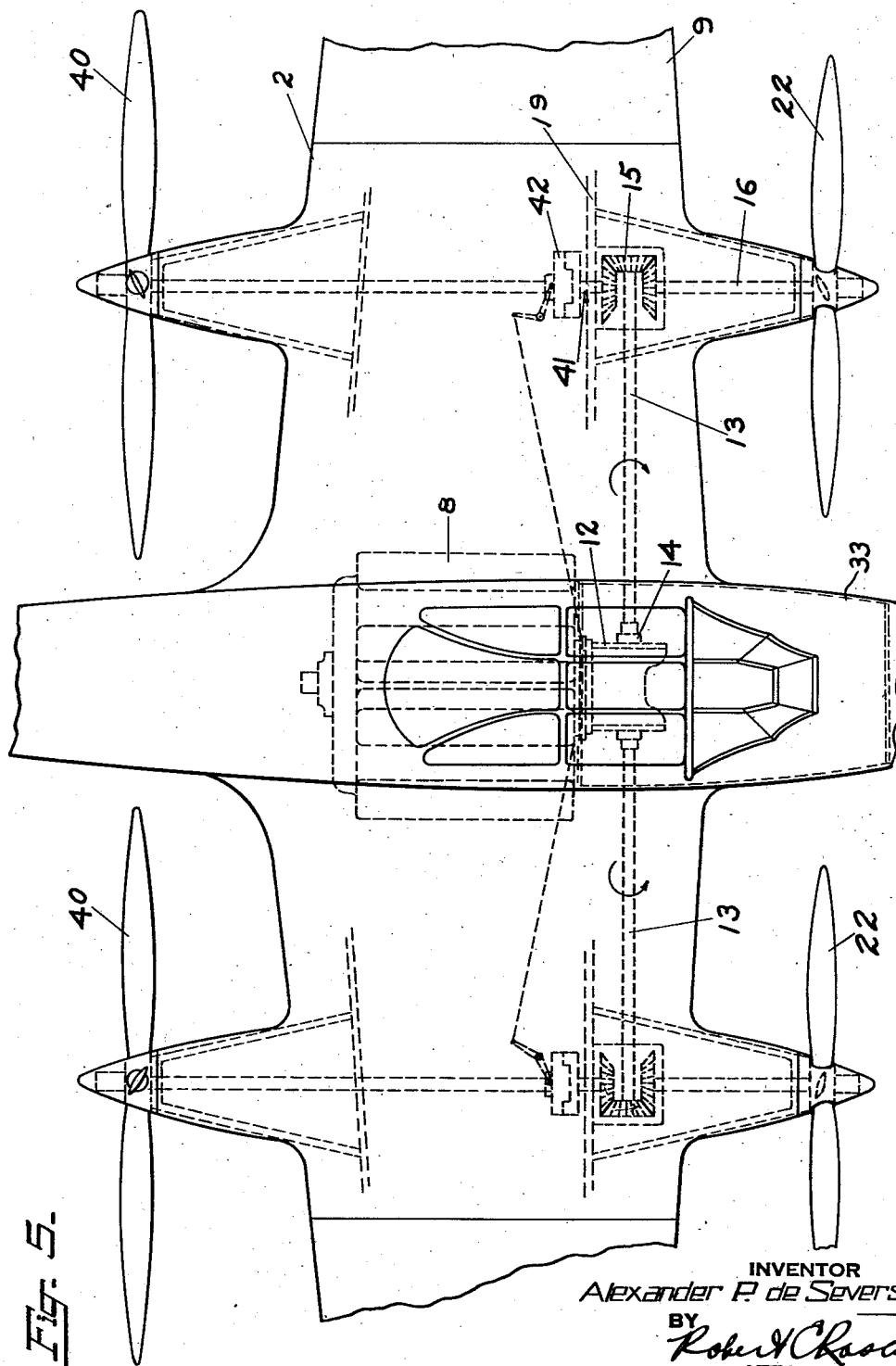

Patented Oct. 29, 1940

2,219,980

UNITED STATES PATENT OFFICE

2,219,980

AIRCRAFT

Alexander P. de Seversky, Northport, N. Y., assignor to Seversky Aircraft Corporation, a corporation of Delaware Application June 15, 1938, Serial No. 213,859

2 Claims. (Cl. 244—54)

This invention relates to airplanes, particularly pursuit airplanes, and its general object is to provide an improved type of pursuit airplane.

Heretofore, pursuit airplanes have employed a propeller in the nose of the fuselage and as a consequence have been subjected to powerful torque-action, involving structural and piloting difficulties and necessitating extreme care in executing certain maneuvers. Whereas in such craft maximum visibility for the pilot is imperative, the presence of the propeller and engine in the nose of the craft has necessitated his being located, disadvantageously, rather far back aft in the fuselage, the nose location of the propeller, engine, cowing etc. and the rear location of the pilot, combining to seriously restrict his range of vision. In the subsistent types of pursuit craft not much armament can be located in the nose and even that modicum involves complex synchronization problems and is difficult to install and fire accurately and unsatisfactory in maintenance and servicing. Recently the tricycle-type of landing-gear has revived in favor for many types of airplanes, but has not been adaptable, hitherto, to pursuit-type airplanes due to the universal use, in such aircraft, of a single engine and propeller carried in the nose of the fuselage and hence leaving an insufficient amount of space in the nose of the fuselage for the auxiliary-wheel abutment, framing, and retracting mechanism.

It is a definite object of this invention to provide a new type of pursuit airplane, one in which there will be no propeller or engine or any other power plant components in the nose of the fuselage and in which instead the power and propelling plant will be so organized, constructed and supported as to thereby result in eminently enhanced visibility for the pilot; materially increased and more efficient, forward-firing armament, in which, further, it will not be necessary to employ synchronization; and a narrower fuselage, as well as better, or "cleaner," streamlining, of the fuselage, may be employed.

It is also an object of the invention to so organize the power and propelling units of pursuit airplanes that tricycle landing gear may be conveniently and safely employed in the nose thereof.

A further object of the invention is to reduce the torque on a single-engine airplane of any type to such an extent as to obviate the necessity for maintaining the neutral position of the rudder to one side of the fore-and-aft line of the craft, and to obviate the necessity for offsetting the fin to one side of the plane of symmetry of the craft to meet the slipstream helix.

The airplane is also provided with means for permitting effective military operation at sub-stratosphere altitudes, and with improved defensive construction. The other objects and advantages of the invention will be made manifest as this disclosure progresses.

Several embodiments of these and other inventive concepts are shown in the accompanying drawings, but it is to be understood that the invention is limited in its embodiments only by the scope of the sub-joined claims. In these drawings:

Figure 1 is a front fragmentary elevation, somewhat diagrammatic, of a pursuit airplane embodying the present improvements;

Figure 2 is a top-plan view thereof;

Figure 3 is a detail perspective of a portion of the fuselage;

Figure 4 is a similar view of a complementary part of the fuselage;

Figure 5 is a fragmentary top-plan of a modified form, and;

Figure 6:
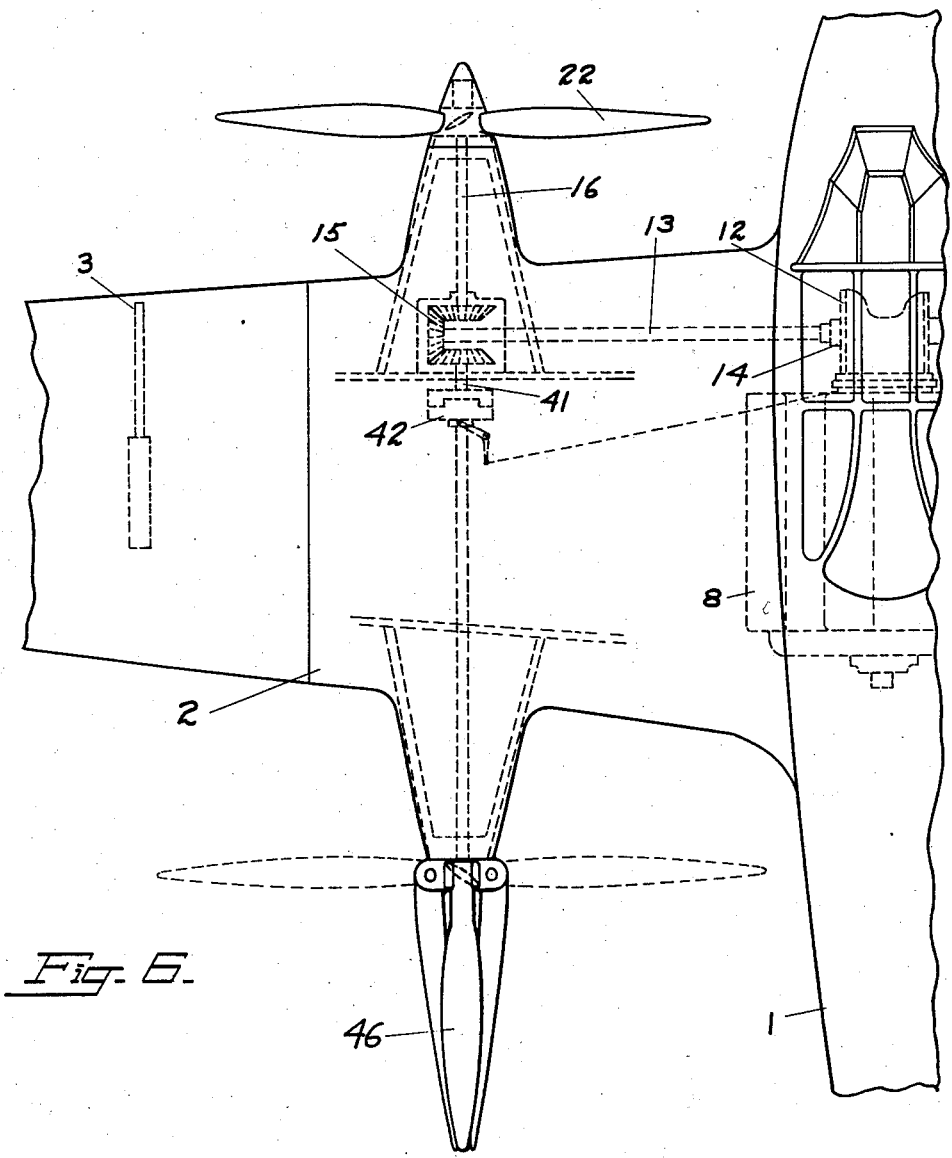
Figure 6 is a fragmentary top-plan of still another modification.

Referring more in detail to the structure shown in Figures 1, 2, 3 and 4, the pursuit craft comprises essentially a fuselage 1 carrying a cantilever sustaining-surface 2 of the "mid-wing" type, as well as an empennage 3. The wing includes a center-section 5 of unusually wide span for a pursuit airplane, and the two main components, 6, of a tricycle landing gear are carried by this center section, the third component 26 being carried in the nose of the fuselage.

The approximate position of the single member of the crew—the pilot—is indicated by numeral 7. An engine 8 of the "W-banked", liquid cooled type,—the entire powerplant of the craft—is located in the bottom of the fuselage, just behind the pilot, on substantially the center of gravity of the craft, and its coolant cooling radiators (not shown) are located in the outboard panels 9 of the wing. The two lower banks of this engine, due to the unique construction of the center-section, extend outwardly into the center-section and the two upper banks are almost vertical, so that the fuselage can be made unusually narrow.

The nose of the fuselage carries no power-plant components or propelling components whatsoever, nor does it carry the pilot and this fact, in conjunction with the placing of engine banks in the center-section allows the fuselage to be made narrow (in practice being limited only by the width of the pilot) and to be given a completely streamlined configuration. Due to the absence of power plant, etc., from the nose, same is also rendered available in almost its entirety for armament, here shown as comprising six fixed-type .50 calibre machine guns 10 and a fixed-type 37 mm. cannon 11. Obviously, however, if desired, a greater number of machine guns and/or cannon may be employed, as well as wing-guns and bombs. An armor-belt 33 of thin, Harveyized steel, or the like, cyindrically lines the fuselage-skin from a plane just forward of the rudder pedals to a plane just aft of the pilot's seat.

In order that the single engine purposely located and organized out of the nose and behind the pilot at the center of gravity may propel the craft without applying torque thereto, the airplane is provided with a main gear box 12 containing gearing (not shown) for rotating shafts 13 in the direction indicated by the arrows. The shafts 13 may be drivingly connected to the stub shafts 14 by universal joints or by a telescoping splined-arrangement. In either case, the outboard end of the shafts 13 bears a bevel-gear 15 adapted to mesh with a corresponding bevel-gear on propeller shafts 16. The shafts 16 are suitably supported in bearings 17 borne by truss-members 18 carried by forward spar 19 of the wing, the whole being housed in a suitable streamlined fairing 20, the front end 21 of which constitutes a spinner for propellers 22, preferably of the three-blade full-feathering type.

By virtue of this arrangement, the propellers 22 are made to revolve in opposite directions, thus tending to eliminate the torque obtaining heretofore in pursuit airplanes. Due also to this feature, the fin 3 of the empennage may be arranged to lie entirely on the fore-and-aft center line of the craft, having none of the offset to one side heretofore necessary to meet effects of the slipstream from a nose-carried propeller, and the neutral position of the rudder is, normally, exactly on the fore-and-aft line of the craft, that is, its neutral position of 0°. Thus, by this feature coupled with the enhanced visibility, the piloting of pursuit planes is rendered easier and less dangerous than heretofore.

The immediately preceding description has more particular reference to the construction shown in Figures 1 and 2. In Figure 5 is shown a construction in which the torque is still further diminished by virtue of organizing the airplane with two three-blade tractor propellers 22 of the full-feathering type, and two pusher propellers 40, also tri-blade. The propellers 40 are also full-feathering. Each of the propellers 40 is adapted to be driven by the engine that drives propellers 22 by virtue of shaft 41 having a clutch 42 thereon. The propellers 22 revolve in opposite directions, and the propellers 40 also. When desired, the propellers 40 can be disconnected from the engine and feathered backwardly to reduce their braking-effect or air resistance. In Figure 6 the two tractor propellers revolve oppositely and so do the pushers. The pusher-propellers are provided with three blades, 46, which are hinged, in a manner generally shown in Figure 6, to the propeller hub. When the craft is flying at altitudes below the substratosphere, these blades remain folded and are thus satisfactorily streamlined. At the substratosphere, the blades 46 are unfolded bringing about a much-needed increase in efficiency of the propelling plant. Any suitable link-mechanism, etc., may be employed for folding and unfolding. In this embodiment, wing guns 50 are also provided.

Referring to Figures 3 and 4, due to the fact that the engine is carried in the fuselage-bottom behind the pilot and as a cantilever-type mid-wing employed, a cradle-mount has been provided for the engine which will also take-up the flexure, torsion and shear of the wing. As shown, this framed-structure, hereinafter referred to as a "cradle," comprises, essentially, two halves, 30 and 31, disengageably united, in the form shown, at the top of the anti-buffeting fillet. Portion 30 carries the engine on the bearers 32. The top half constitutes the upper half of the fuselage and is removable to permit access to the engine for servicing, repairs, etc., and to allow easy removal thereof. Hand-holes (not shown) are provided at the sides of part 30, and an opening (not shown) is provided in the bottom of the fuselage skin for ease of access to the accessories.

In all embodiments, the cockpit is contemplated as being closable into an airtight condition and means (not shown) are provided for supercharging same with additional air to permit operations at the sub-stratosphere altitude.

Having now made certain the nature of my invention and in what manner it can be performed, what I claim as my property and desire to secure by Letters Patent of the United States, is:

1. In an airplane having a fuselage and a pair of hollow wings extending from opposite sides of the fuselage, said wings including spars extending longitudinally of the wings and a pair of panels closing the opposed inner ends of the wings and forming portions of the side walls of the fuselage, the spars of said wings being disposed in alignment and projecting through said panels so as to provide vertical ribs upon the interior of the fuselage; means for structurally uniting said wings and forming a cradle for mounting an engine, said means comprising a pair of laterally-spaced partitions extending between the panels, structural framing located at the bottom of the fuselage, said framing comprising bearer members extending longitudinally between the partitions and cross-members extending transversely between corresponding aligned spars and arched downwardly with respect to the fuselage, the ends of said cross-members embracing and rigidly connected to the lower portions of the vertical ribs, and a cover for said cradle comprising end plates supported by the partitions and upwardly arched bridge members extending between corresponding aligned spars, the ends of said bridge members embracing and rigidly connected to the upper portions of the vertical ribs, whereby stresses tending to cause folding of the wings are transmitted to and effectively resisted by the arched structural framing extending along the bottom and top of the cradle.

2. In an airplane construction corresponding to claim 1, in which the cross members comprise trussed structural members.

ALEXANDER P. DE SEVERSKY.